United States Patent Office 3,249,581
Patented May 3, 1966

3,249,581
OLEFIN-SUBSTITUTED SILICONE POTTING COMPOUNDS
Melvin E. Nelson, Midland, Mich., assignor to Dow Corning Corporation, Midland, Mich., a corporation of Michigan
No Drawing. Filed Nov. 29, 1963, Ser. No. 327,090
13 Claims. (Cl. 260—37)

This invention relates to olefin-substituted silicone potting compounds.

Potting compounds are curable fluids that are primarily used to imbed electronic components in a firm medium, thus protecting them from air, shock, and vibration; serving both as a protective cover and as an electrical insulation. Often whole electronic circuits made of dozens of individual parts are imbedded in one slab of potting compound. The individual, potted circuits are then ready for rougher handling, and easier assembly into a large system. It is doubtful whether rocket and aircraft carried computers would be possible without potting resins to protect the computer components from accelerative and vibrational forces.

The potting compound is poured over the electronic circuit, and is then cured, usually by gentle heating. It is important that no air spaces remain trapped in the maze of circuitry that may be involved, for such air spaces are usually better conductors than the potting resin itself, and they may be sources of short circuits. It is desirable, therefore, to have a potting compound that is of low viscosity before curing in order to assure maximum penetration of the circuitry by the potting resin before cure.

It is an object of this invention to provide a potting compound of low viscosity before cure. It is also an object of this invention to provide a potting compound of lower cost than any other silicone potting resin yet made.

The potting compounds described herein also possess many of the advantages of the prior-known silicone potting compounds, heat stability, flexibility after cure, and transparency (if desired).

This invention relates to a curable mixture with a viscosity of less than 500,000 cs. consisting essentially of four ingredients. Ingredient (1) is a siloxane copolymer with a viscosity of over 500 cs. consisting essentially of

units plus an average of at least two

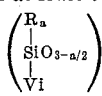

units per molecule, and not more than two mol percent of said units in said copolymer, where Me is the methyl radical, R is an ethyl, methyl, or phenyl radical, no more than 40% of the R groups being phenyl, Vi is the vinyl radical, and $a$ is 0, 1 or 2.

Ingredient (1) may, optionally, also contain up to 50 weight percent based on the total weight of (1) of a copolymer of $SiO_2$, $Me_3SiO_{1/2}$, and $Me_2ViSiO_{1/2}$ siloxane units. There are from 1.5 to 3.5 weight percent of vinyl groups in this copolymer, based on the weight of the optional copolymer. Also, the ratio of the total number of $Me_3SiO_{1/2}$ and $Me_2ViSiO_{1/2}$ units to the number of the $SiO_2$ units must be from 0.6:1 to 1:1.

Ingredient (2) is a siloxane copolymer consisting essentially of

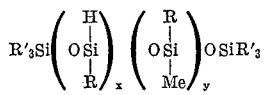

where R' can be a monovalent hydrocarbon radical or hydrogen, R is as above defined, $x$ is an integer of at least 4, and $y$ is an integer of 0 through 3750, the sum of $x$ and $y$ being no more than 5000, and $y$ being no more than three times as large as $x$; or ingredient (2) can be a cyclic compound of the formula

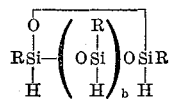

where $b$ is an integer of at least 2.

Ingredient (3) is a liquid alpha-olefin with a boiling point of at least 100° C. and of the formula

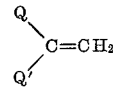

where Q is a monovalent hydrocarbon radical and Q' is hydrogen, but when Q is aromatic, then Q' can be hydrogen or a lower alkyl radical.

Ingredient (4) is a platinum catalyst, and, optionally, there can be a filler.

The proportion of ingredient (2) relative to ingredient (1) must be at least sufficient to provide a sufficient excess of SiH groups over SiVi groups to permit at least 1% by weight of the alpha-olefin (ingredient 3) based on the combined weight of (1) and (2), to react with (2). Also, the amount of ingredient (3) is from 1 to 45% by weight, based on the combined weight of (1) and (2). It is preferred that there be no more of (3) than there are available SiH groups to react with. In other words, it is preferred that there be essentially no unreacted olefin in the final product. However, in some cases up to 25% unreacted olefin can be tolerated. In the latter case there are up to 25% more olefin groups present than there are SiH groups for it to react with.

It is preferable that there not be an excess of unreacted SiH groups, since large number of SiH groups decrease the heat stability of the composition. However, a small excess of SiH group is not harmful to the system.

Up to 200% by weight of filler can be used in the composition of this invention, based on the weight of the other ingredients.

R' can be hydrogen or any monovalent hydrocarbon radical such as alkyl radicals such as methyl, octyl, octadecyl and isopropyl; alkenyl radicals such as vinyl, allyl, and hexenyl; cycloaliphatic radicals such as cyclohexyl, cyclohexenyl, and cyclopentyl; aromatic radicals such as phenyl, xenyl, and tolyl, and aralkyl radicals such as benzyl and beta-phenylethyl.

Q can be any monovalent hydrocarbon radical such as alkyl radicals such as methyl, octyl, octadecyl and isopropyl; alkenyl radicals such as vinyl, allyl, and hexenyl; cycloaliphatic radicals such as cyclohexyl, cyclohexenyl, and cyclopentyl; aromatic radicals such as phenyl, xenyl, and tolyl, and aralkyl radicals such as benzyl and beta-phenylethyl.

Q' is hydrogen, but when Q is an aromatic radical such as phenyl or tolyl, then Q' can be hydrogen or lower alkyl such as methyl, hexyl, isopropyl, etc.

Small amounts of chain branching groups, nonvinylic endblockers, and impurities may be included in the compositions of this invention without negating the effectiveness of the composition, and such compositions are not deemed to be outside the scope of this invention. Furthermore, antioxidants such as N,N'-di-alpha-naphthyl-p-phenylenediamine can be added in order to improve the stability of the compositions of this invention, or other silicone rubber additives can be incorporated for their usual functions.

Ingredient (1) can consist of various siloxanes, several examples of which follow:

(a) 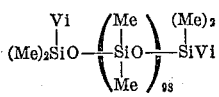

(b) 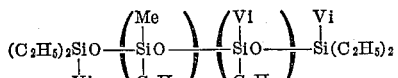 80% plus 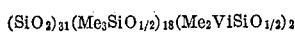 20%

(c) 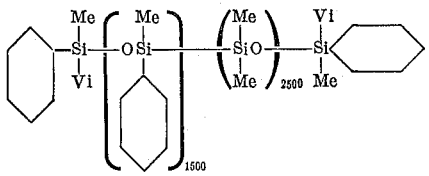 50% plus 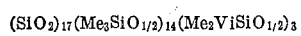 50%

(d) 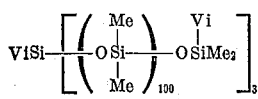

Ingredient (2) can consist of various siloxanes, several examples of which follow:

(a) 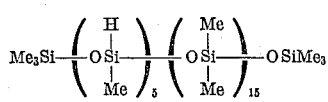

(b) 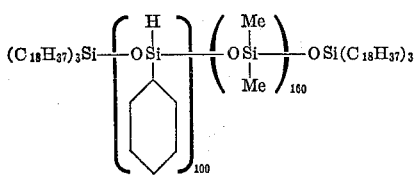

(c) 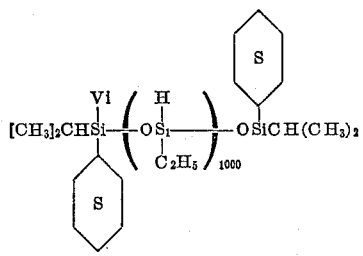

(d) 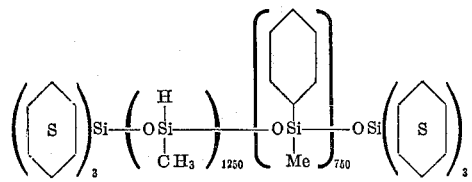

(e) 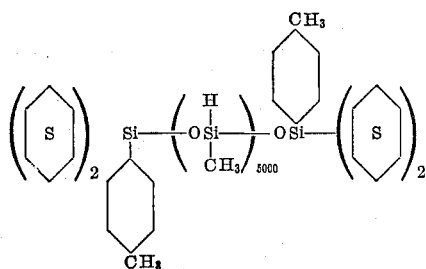

(f) 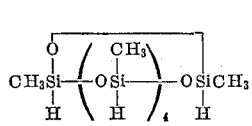

(g) 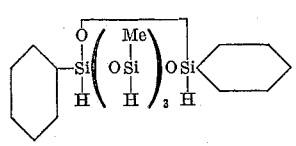

(h) 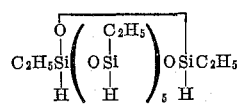

Ingredient (3) can be any liquid alpha-olefin with a boiling point of at least 100° C. of the formula

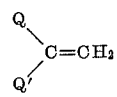

where Q and Q' are as defined above, such as: styrene, alpha-methyl styrene, vinyl toluene, 1-octene, 1-octadecene, alpha-isopropyl styrene, 4-methyl octene-1, 8-phenyloctene-1, 3-phenylpropylene-1, 2-methyl-3-phenylpropylene-1, divinylbenzene, etc.

Ingredient (4) can be a platinum catalyst in any finely divided form such as finely divided platinum, platinum dispersed on charcoal or other carriers, and soluble compounds of platinum such as chloroplatinic acid or complexes of platinic chloride with olefins such as ethylene, propylene, butadiene, cyclohexene, etc. Preferably the platinum should be in soluble form.

The amount of platinum is not critical since it merely affects the rate of cure. However, for practical operation, it is preferred that the catalyst be employed in amounts ranging from 0.5 to 20 parts per million based on the weight of (1), (2) and (3).

If desired, fillers may be employed in the compositions of this invention. These fillers are used when optical clarity is not desired. Fillers which can be used are the normal fillers for organopolysiloxanes such as fume silica, aluminum silicate, quartz, calcium carbonate, zirconium silicate, and metal oxides such as alumina, zinc oxide, titania, and ferric oxide. If desired, the fillers can be treated with organosilicon compounds such as chlorosilanes or alkoxysilanes so as to produce a hydrophobic surface. This treatment is particularly desirable with finely divided silicas, such as fume silicas or silica aerogels.

The ingredients employed in the compositions of this invention are made by well-known processes, several being commercially available. The optional ingredient employed in (1) can be prepared by the cohydrolysis of the silanes of the formulae $SiX_4$, $Me_3SiX$, and $Me_2ViSiX$ in the proper proportions to give the desired ratios, X being halogen or alkoxy radicals. Alternatively, the copolymer can be prepared by the procedure described in U.S. Patent 2,676,182, which involves reacting a silica hydrosol with hexamethyldisiloxane or trimethylchlorosilane and with divinylchlorosilane or divinyltetramethyldisiloxane. The latter can be reacted with the silica hydrosol, either simultaneously with or subsequently to reaction with the trimethylchlorosilane or hexamethyldisiloxane. Preferably the vinyl constituent is reacted with the hydrosol subsequently to the trimethylsilyl constituent.

It was stated above that the two great advantages of the materials of this invention are that they can be less viscous before cure than other siloxane potting compounds, and that they will tend to be cheaper than other siloxane potting compounds. Both of these objectives are attained by the inventive step of this invention, i.e., the incorporation of an alpha-olefin into the siloxane resin. The alpha-olefins reduce the viscosity of the composition, yet upon and after curing, they do not evaporate to any great degree leaving bubbles and spaces inside the potting compound, or causing the compound to shrink. The problem of evaporation has heretofore severely limited the use of solvents to cut the viscosity of potting compounds. The advantage of the method of this invention is that the solvent that reduces the viscosity is chemically incorporated into the compound itself upon curing.

It is believed that this occurs because the curing of the resin takes place through the combination of SiH and SiVi or other terminal olefinic bonds in the following manner:

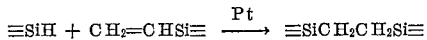

However, terminal olefinic groups that are not attached to silicon atoms can also undergo this reaction, so the alpha-olefin solvent will likewise react with SiH groups, becoming tied into the cured polymer. It is for this reason that it is preferred that there be sufficient SiH to react with all the vinyl groups that are present. The compositions of this invention cure upon heating, preferably from 50 to 100° C., whereupon curing proceeds in four hours or less.

The potting compounds of this invention tend to be cheaper than ordinary siloxane potting compounds, for many alpha-olefins (e.g. styrene) cost only about 1/25 as much per pound as siloxanes, and, as an ingredient, they lower the per pound cost of the entire composition without significantly lowering the per pound effectiveness.

The following examples are for illustrative purposes only, and should not be construed as limiting the invention which is properly delineated in the appended claims. The following abbreviations are employed: Me is methyl, Vi is vinyl, Ph is phenyl and Et is ethyl.

*Example 1*

To 100 parts by weight of a vinyl-endblocked dimethylsiloxane of 2000 cs. viscosity was mixed 13 parts of

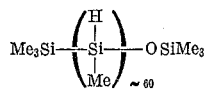

25 parts of alpha-methylstyrene, and 5 parts per million of platinum, in the form of a chloroplatinic acid solution. The fluid mixture was evacuated to remove air bubbles, and then cured at 65° C. for 3 hours. A clear, rubbery solid resulted.

*Example 2*

To 20 g. of a vinyl-endblocked dimethylsiloxane of 2000 cs. viscosity was added 8 g. of a mixture of straight chain alpha-olefins with a carbon chain length of eleven through fifteen, 3 g. of

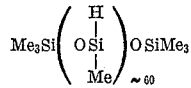

and 10 parts per million of platinum in the form of a chloroplatinic acid solution. The composition was mixed, evacuated to remove air bubbles, and cured at 65° C. A solid material was formed.

*Example 3*

20 g. of

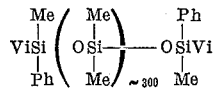

5 g. of alpha-methylstyrene, 2.5 g. of

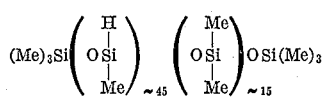

and a trace of chloroplatinic acid solution were mixed, evacuated to remove air bubbles, and cured. A clear solid material was formed.

*Example 4*

The experiment of Example 1 was repeated, substituting divinylbenzene for alpha-methylstyrene in batch A, styrene for alpha-methylstyrene in batch B, and vinyltoluene for alpha-methylstyrene in batch C. On curing, batch A became a hard material; batches B and C became rubbery materials.

*Example 5*

To 100 parts of a vinyl-endblocked dimethylsiloxane of 2000 cs. viscosity was mixed 10 parts of

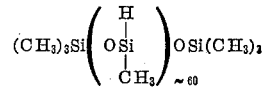

17 parts of styrene, 75 parts of finely divided silica, and 5 p.p.m. of a chloroplatinic acid solution.

The mixture was cured for 4 hours at 65° C. A rubbery material was formed that had a durometer measurement of 38 on the Shore A scale.

*Example 6*

When the following ingredients are mixed and cured at 150° C. for 3 hours, rubbery solid is formed:

(1) 20 g. of a mixture consisting of the following siloxane copolymers:

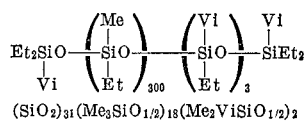

(2) 20 g. of

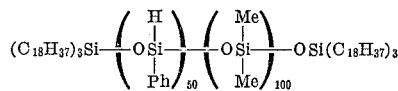

(3) 7.0 g. of 1,6-octadiene
(4) 5 parts per million chloroplatinic acid solution, and
(5) 20 g. of finely divided alumina.

*Example 7*

When the following ingredients are mixed and cured at 150° C. for 3 hours, a rubbery solid is formed:

(1) 20 g. of a mixture consisting of the following siloxane copolymers:

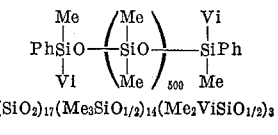

(2) 10 g. of

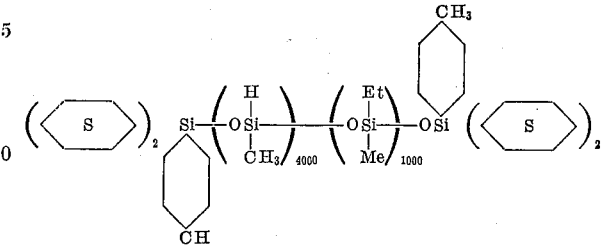

(3) 16 g. of alpha-isopropylstyrene,
(4) 10 parts per million of finely divided platinum.

*Example 8*

When the following ingredients are mixed and cured at 100° C. for 2 hours, a rubbery solid is formed:

(1) 30 g. of

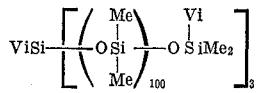

(2) 10 g. of

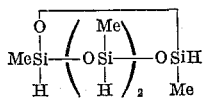

(3) 20 g. of 2-tolylpropene-1,
(4) 20 parts per million of platinic chloride cyclohexene complex, and
(5) 30 g. of calcium carbonate.

Example 9

When the following ingredients are mixed and cured at 100° C. for 3 hours a solid is formed:

(1) 100 g. of

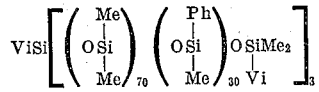

(2) 100 g. of

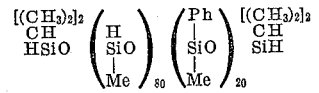

(3) 120 g. of 3-phenylpropylene-1
(4) 10 parts per million of chloroplatinic acid, and
(5) 100 g. of ferric oxide.

That which is claimed is:
1. A composition, capable of curing, having a viscosity of less than 500,000 cs., consisting essentially of
   (1) a siloxane copolymer with a viscosity of over 500 cs. consisting essentially of

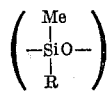

units plus an average of at least two

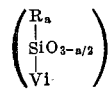

units per molecule, and not more than 2 mol percent of said units, where
   Me is the methyl radical,
   R is selected from the group consisting of the ethyl, methyl, and phenyl radicals, no more than 40% of the R groups in this ingredient being phenyl,
   Vi is the vinyl radical, and
   $a$ is an integer with a range of 0 through 2; there being present from 0 to 50 weight percent based on the total weight of (1) of a copolymer of $SiO_2$, $Me_3SiO_{1/2}$, and $Me_2ViSiO_{1/2}$ siloxane units, in which copolymer there is from 1.5 through 3.5 percent by weight vinyl groups based on the weight of said latter copolymer, the ratio of the total $Me_3SiO_{1/2}$ and $Me_2ViSiO_{1/2}$ to $SiO_2$ units in said latter copolymer being from 0.6:1 to 1:1;
   (2) a siloxane polymer selected from the group consisting of

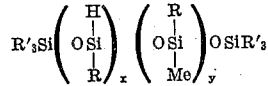

where
   R' is selected from the group consisting of monovalent hydrocarbon radicals and hydrogen,
   R is as above defined,
   $x$ is an integer of at least 4, and
   $y$ is an integer of 0 through 3750, the sum of $x$ and $y$ being no more than 5000 and $y$ being no more than 3 times as large as $x$; and

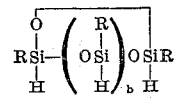

where
   $b$ is an integer of at least 2;
(3) a liquid alpha-olefin with a boiling point of at least 100° C. of the formula

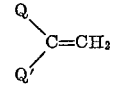

where
   Q is a monovalent hydrocarbon radical and
   Q' is hydrogen, but when Q is aromatic, then Q' is selected from the group consisting of hydrogen and lower alkyl radicals;
(4) a platinum catalyst, and,
from 0 to 200 weight percent, based on the weight of ingredients (1) through (4), of a filler; the amount of (2) relative to (1) being at least sufficient to provide a sufficient excess of SiH groups over SiVi groups to permit at least 1% by weight alpha-olefin based on the weight of (1) and (2), to react with (2); the amount of (3) being from 1% to 45% by weight, based on the combined weight of (1) and (2); the amount of (3) being no more than 25% in excess of the amount required to react with the available SiH groups.
2. A composition, capable of curing, having a viscosity of less than 500,000 cs., consisting essentially of
   (1) a siloxane copolymer with a viscosity of over 500 cs. consisting essentially of

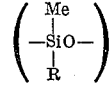

units plus an average of at least two

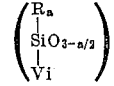

units per molecule, and not more than 2 mol percent of said units, where
   Me is the methyl radical,
   R is selected from the group consisting of the ethyl, methyl, and phenyl radicals, no more than 40% of the R groups in this ingredient being phenyl,
   Vi is the vinyl radical, and
   $a$ is an integer with a range of 0 through 2; there being present from 0 to 50 weight percent based on the total weight of (1) of a copolymer of $SiO_2$, $Me_3SiO_{1/2}$, and $Me_2ViSiO_{1/2}$ siloxane units, in which copolymer there is from 1.5 through 3.5 percent by weight vinyl groups based on the weight of said latter copolymer, the ratio of the total $Me_3SiO_{1/2}$ and $Me_2ViSiO_{1/2}$ to $SiO_2$ units in said latter copolymer being from 0.6:1 to 1:1;
   (2) a siloxane polymer selected from the group consisting of

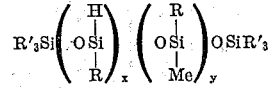

where
   R' is selected from the group consisting of monovalent hydrocarbon radicals and hydrogen,
   R is as above defined,
   $x$ is an integer of at least 4, and $y$ is an integer of 0 through 3750, the sum of $x$ and $y$ being no more than 5000 and $y$ being no more than 3 times as large as $x$; and

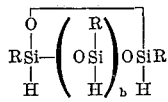

where
 $b$ is an integer of at least 2;
(3) a liquid alpha-olefin with a boiling point of at least 100° C. of the formula

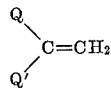

where
 Q is a monovalent hydrocarbon radical and
 Q' is hydrogen, but when Q is aromatic, then
  Q' is selected from the group consisting of hydrogen and lower alkyl radicals;
(4) a platinum catalyst, and,
from 0 to 200 weight percent, based on the weight of ingredients (1) through (4), of a filler; the amount of (2) relative to (1) being at least sufficient to provide a sufficient excess of SiH groups over SiVi groups to permit at least 1% by weight alpha-olefin based on the weight of (1) and (2), to react with (2); the amount of (3) being from 1% to 45% by weight, based on the combined weight of (1) and (2); there being no more of (3) than there are available SiH groups to react with.

3. The composition of claim 2 where R is methyl.
4. The composition of claim 2 where $a$ is 2.
5. The composition of claim 2 where R' is methyl.
6. The composition of claim 2 where $x$ has an average value of 40 through 80.
7. The composition of claim 2 where $y$ has an average value of 10 through 40.
8. The composition of claim 2 where ingredient (3) is styrene.
9. The composition of claim 2 where ingredient (3) is alpha-methylstyrene.
10. The composition of claim 2 where ingredient (3) is vinyl toluene.
11. The process of imbedding an electronic component in a composition, capable of curing, having a viscosity of less than 500,000 cs., consisting essentially of
 (1) a siloxane copolymer with a viscosity of over 500 cs. consisting essentially of

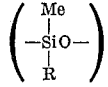

units plus an average of at least two

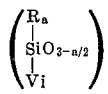

units per molecule, and not more than 2 mol percent of said units, where
 Me is the methyl radical,
 R is selected from the group consisting of the ethyl, methyl, and phenyl radicals, no more than 40% of the R groups in this ingredient being phenyl,
 Vi is the vinyl radical, and
 $a$ is an integer with a range of 0 through 2; there being present from 0 to 50 weight percent based on the total weight of (1) of a copolymer of $SiO_2$, $Me_3SiO_{1/2}$, and $Me_2ViSiO_{1/2}$ siloxane units, in which copolymer there is from 1.5 through 3.5 percent by weight vinyl groups based on the weight of said latter copolymer, the ratio of the total $Me_3SiO_{1/2}$ and $Me_2ViSiO_{1/2}$ to $SiO_2$ units in said latter copolymer being from 0.6:1 to 1:1;

(2) a siloxane polymer selected from the group consisting of

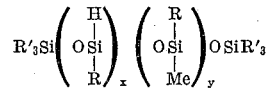

where
 R' is selected from the group consisting of monovalent hydrocarbon radicals and hydrogen,
 R is as above defined,
 $x$ is an integer of at least 4, and
 $y$ is an integer of 0 through 3750, the sum of $x$ and $y$ being no more than 5000 and $y$ being no more than 3 times as large as $x$; and

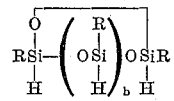

where
 $b$ is an integer of at least 2;
(3) a liquid alpha-olefin with a boiling point of at least 100° C. of the formula

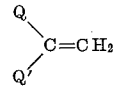

where
 Q is a monovalent hydrocarbon radical and
 Q' is hydrogen, but when Q is aromatic, then
  Q' is selected from the group consisting of hydrogen and lower alkyl radicals;
(4) a platinum catalyst, and,
from 0 to 200 weight precent, based on the weight of ingredients (1) through (4), of a filler; the amount of (2) relative to (1) being at least sufficient to provide a sufficient excess of SiH groups over SiVi groups to permit at least 1% by weight alpha-olefin based on the weight of (1) and (2), to react with (2); the amount of (3) being from 1% to 45% by weight, based on the combined weight of (1) and (2); the amount of (3) being no more than 25% in excess of the amount required to react with the available SiH groups to react with, and then curing the composition.

12. The product made by the process of claim 11.
13. The process of making a composition that is capable of curing, comprising adding together the following ingredients:
 (1) a siloxane copolymer with a viscosity of over 500 cs. consisting essentially of

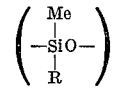

units plus an average of at least two

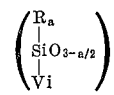

units per molecule, and not more than 2 mol percent of said units, where
 Me is the methyl radical,
 R is selected from the group consisting of the ethyl, methyl, and phenyl radicals, no more than 40% of the R groups in this ingredient being phenyl,
 Vi is the vinyl radical, and
 $a$ is an integer with a range of 0 through 2; there being present from 0 to 50 weight percent based on the total weight of (1) of a copolymer of $SiO_2$, $Me_3SiO_{1/2}$, and $Me_2ViSiO_{1/2}$ siloxane units, in which copolymer there is from 1.5 through 3.5 percent by weight vinyl groups based on the weight of said latter copolymer, the ratio of the total $Me_3SiO_{1/2}$ and $Me_2ViSiO_{1/2}$ to $SiO_2$ units in said latter copolymer being from 0.6:1 to 1:1;

(2) a siloxane polymer selected from the group consisting of

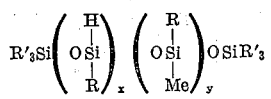

where
R′ is selected from the group consisting of monovalent hydrocarbon radicals and hydrogen,
R is as above defined,
$x$ is an integer of at least 4, and
$y$ is an integer of 0 through 3750, the sum of $x$ and $y$ being no more than 5000 and $y$ being no more than 3 times as large as $x$; and

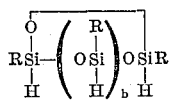

where
$b$ is an integer of at least 2;

(3) a liquid alpha-olefin with a boiling point of at least 100° C. of the formula

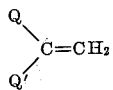

where
Q is a monovalent hydrocarbon radical and
Q′ is hydrogen, but when Q is aromatic, then Q′ is selected from the group consisting of hydrogen and lower alkyl radicals.

(4) a platinum catalyst, and,
from 0 to 200 weight percent, based on the weight of ingredients (1) through (4), of a filler; the amount of (2) relative to (1) being at least sufficient to provide a sufficient excess of SiH groups over SiVi groups to permit at least 1% by weight alpha-olefin based on the weight of (1) and (2), to react with (2); the amount of (3) being from 1% to 45% by weight, based on the combined weight of (1) and (2); the amount of (3) being no more than 25% in excess of the amount required to react with the available SiH groups.

References Cited by the Examiner
UNITED STATES PATENTS

| | | | |
|---|---|---|---|
| 2,823,218 | 2/1958 | Speier et al. | 260—825 |
| 3,020,260 | 2/1962 | Nelson | 260—827 |
| 3,159,601 | 1/1964 | Ashby | 260—46.5 |
| 3,188,299 | 6/1965 | Chalk | 260—46.5 |

SAMUEL H. BLECH, *Primary Examiner.*

UNITED STATES PATENT OFFICE
CERTIFICATE OF CORRECTION

Patent No. 3,249,581                                              May 3, 1966

Melvin E. Nelson

It is hereby certified that error appears in the above numbered patent requiring correction and that the said Letters Patent should read as corrected below.

Column 3, lines 40 to 50, the formula should appear as shown below instead of as in the patent:

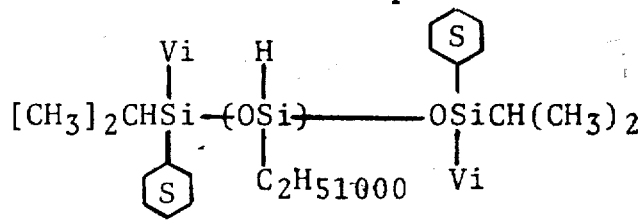

column 5, lines 35 to 39, the formula should appear as shown below instead of as in the patent:

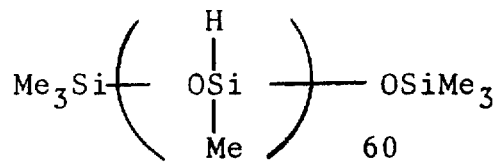

column 6, lines 55 to 63, the formula should appear as shown below instead of as in the patent:

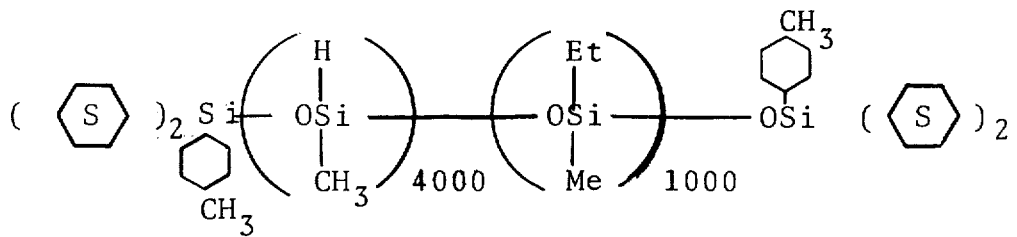

Signed and sealed this 5th day of September 1967.

(SEAL)
Attest:

ERNEST W. SWIDER
Attesting Officer

EDWARD J. BRENNER
Commissioner of Patents